J. T. AMES.
DAM FOR IRRIGATING DITCHES.
APPLICATION FILED APR. 1, 1914.

1,117,543.

Patented Nov. 17, 1914.

WITNESSES
M. R. McInnis
E. A. Paul

INVENTOR
JOHN T. AMES
BY Paul & Paul
ATTORNEYS

UNITED STATES PATENT OFFICE.

JOHN T. AMES, OF BRIDGER, MONTANA.

DAM FOR IRRIGATING-DITCHES.

1,117,543.  Specification of Letters Patent.  Patented Nov. 17, 1914.

Application filed April 1, 1914. Serial No. 828,752.

*To all whom it may concern:*

Be it known that I, JOHN T. AMES, citizen of the United States, resident of Bridger, county of Carbon, State of Montana, have invented certain new and useful Improvements in Dams for Irrigation-Ditches, of which the following is a specification.

In irrigating land it is customary for the person to whom the water is delivered in a small or lateral ditch, as distinguished from the large supply ditch, to obstruct this small ditch by some suitable means, and then cut away the bank to allow the water to spread out over the land, the obstructing means being moved from place to place and the banks cut or opened temporarily until the desired area has been irrigated.

The object of my invention is to provide an obstructing means or dam which can be easily and quickly dropped into the ditch to effectually check the flow of the water therethrough, and rapidly moved from place to place during the progress of the irrigating work.

The invention consists generally in various constructions and combinations, all as hereinafter described and particularly pointed out in the claims.

Figure 1:
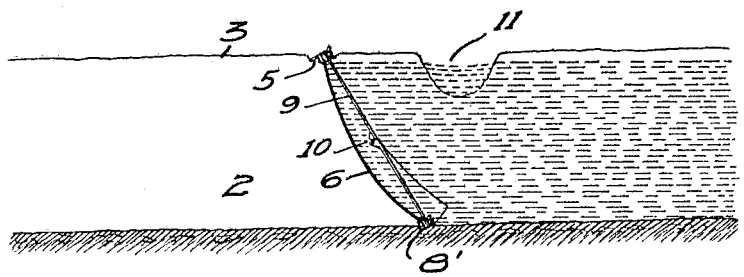
Figure 2:
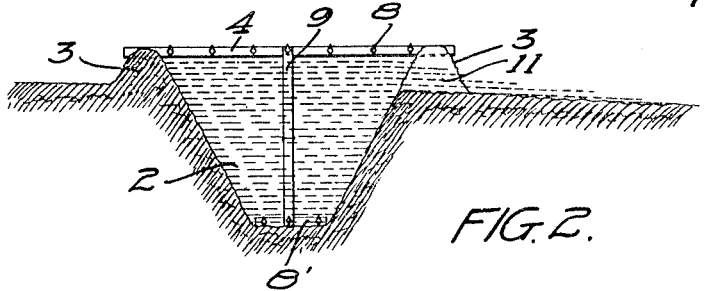
Figure 6:
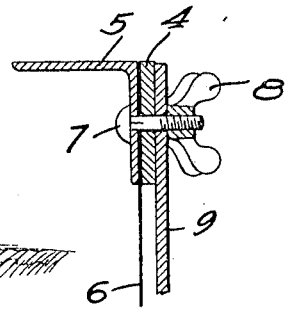
Figure 3:
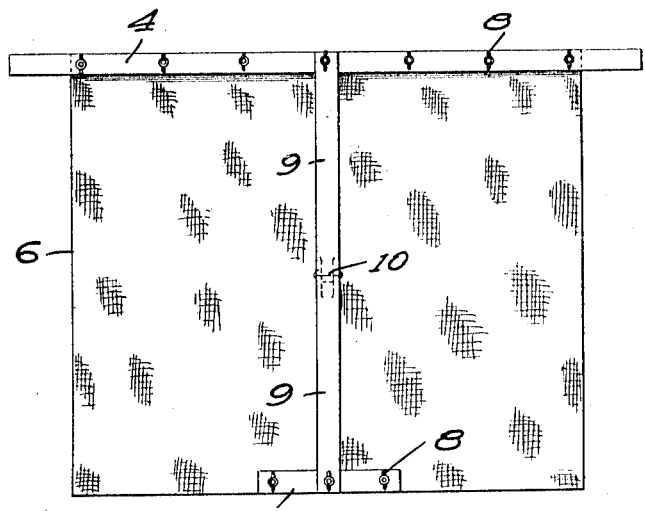
Figures 4, 5:
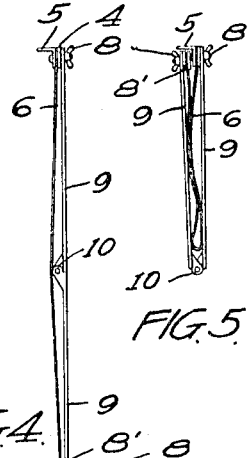

In the accompanying drawings forming part of this specification, Figure 1 is a sectional view of an irrigating ditch with my invention placed therein, Fig. 2 is a transverse view of the same, Fig. 3 is a front view of the device removed from the ditch, Fig. 4 is an edge view, Fig. 5 is a similar view, showing the device folded, Fig. 6 is a detail view, illustrating the structure of the dam.

In the drawing, 2 represents an irrigating ditch, such as is usually constructed across a person's land and connected with the main or supply ditch. This ditch has banks 3 which are raised above the level of the surrounding ground.

4 and 5 are bars, between which the upper edge of an apron formed of flexible material, such as canvas 6, is secured by means of a series of threaded bolts 7 and thumb nuts 8 mounted thereon. The ends of these bars project beyond the canvas and are adapted to rest upon the banks of the ditch, as indicated in Fig. 1. The opposite edge of the canvas is secured between the bars 8′ by means of similar bolts and thumb nuts and these bars are adapted to rest upon the bottom of the ditch and correspond substantially in length to the width of the ditch. A bar 9 is connected at its opposite ends to the bars at the top and bottom of the canvas fabric and has a hinge at 10 therein which allows the lower portion of the fabric to be folded upwardly upon the upper portion, as indicated in Fig. 5, for convenience in handling and moving the device from place to place. This hinge is in the form of an elbow which allows the sections of the bar to be swung out of alinement with one another in one direction, but prevents them from swinging out of alinement in the opposite direction. This bar has the function of a rigid connection between the top and bottom of the dam, and when the bars at the top of the dam are laid upon the side walls of the ditch, the flow of the water will carry the dam down into the ditch until the lower bar 8′ strikes the bottom, as indicated in Fig. 1, where it will be held by the pressure of the water against the canvas wall 6. The water will also force the edges of the fabric against the side walls of the ditch and temporarily obstruct the flow, if not entirely stop it, an opening having been cut through the side wall as at 11. The water will flow out through this opening and spread over the land to be irrigated, and the flow may continue as long as the irrigation of this part of the cultivated land is desired. The dam may then be removed to another point in the ditch to repeat the operation, and as often as the dam is removed, the side wall will be repaired.

It will be observed that the device is extremely simple in construction, no shoveling is required to place it in the ditch and make it comparatively water-tight. It is easily placed in operation and as readily removed for insertion into the ditch at another point.

The device may be made in various sizes, according to the size and capacity of the ditch, and in various ways the details of construction may be modified and still be within the scope of my invention.

I claim as my invention:

1. An irrigating ditch dam comprising a comparatively short member adapted to rest upon the bottom of the ditch, a comparatively long member adapted to rest upon the top of the side walls and bridge the ditch, and a flexible apron having its upper and lower ends secured respectively to said members and extending outwardly on each side beyond said first named member and adapted to lie against the walls of the ditch and be held thereon by the pressure of the water, and a single jointed member centrally arranged in the dam and having its ends connected to the middle portions of said members and operating to hold said members apart when the pressure of the water is against one side of said flexible apron.

2. An irrigating ditch dam comprising upper and lower members, each composed of a plurality of bars and bolts with thumb nuts mounted therein, a flexible apron having its upper and lower edges inserted between the bars of said members and clamped therein by the tightening of said thumb nuts, a jointed bar connecting said lower member with said upper member and normally tending to hold said bars apart and said lower member against the bottom of the ditch when the pressure of the water is applied to one side of said flexible apron.

3. An irrigating ditch dam comprising a bar to lie upon the bottom of the ditch, a second bar arranged to bridge the ditch and rest upon the walls thereof, flexible apron secured at its lower edge to said first named bar and at its upper edge to said second named bar, a jointed bar connected at one end to the middle portion of said first named bar and at its other end to the middle portion of said second named bar, said jointed bar having a hinge therein mounted to open with the pressure of the water in said ditch, the sections of said jointed bar being adapted to be turned over upon one another for compact folding of the dam.

In witness whereof, I have hereunto set my hand this 27th day of March 1914.

JOHN T. AMES.

Witnesses:
A. P. HESLOP,
EDWARD JENKIN.

Copies of this patent may be obtained for five cents each, by addressing the "Commissioner of Patents, Washington, D. C."